Patented Mar. 3, 1931

1,795,134

UNITED STATES PATENT OFFICE

JOHN W. MEYER, OF WEST CAPE MAY, NEW JERSEY

LACQUER SURFACE TAR REMOVER AND POLISH

No Drawing.	Application filed November 2, 1927. Serial No. 230,693.

This invention relates to a preparation for removing tar, grease and soil from lacquered and other finished surfaces of vehicles and for restoring the finish of furniture and analogous articles having a polished surface.

The composition contains the following specified ingredients in about the proportions stated:

1 oz. citronella; 1 oz. spirits of camphor; 2 oz. paraffine; 12 oz. petroleum distillate (kerosene).

The paraffine is gradually heated in a suitable vessel over hot air or steam to reduce it to a liquid state. The citronella, spirits of camphor and petroleum distillate are heated in a separate vessel.

The melted paraffin and the heated mixture of citronella, spirits of camphor and kerosene are combined and thoroughly mixed and agitated and set aside to cool. The resultant composition is then ready for use and is a solvent for and remover of road tar, grease and the like and is a restorer of lacquered and other similar finished surfaces of vehicles, furniture and articles having a polished or highly finished surface.

Having thus described the invention, I claim:

The process of producing a composition for removing grease and tar from lacquered surfaces comprising heating one part spirits of camphor together with one part citronella and twelve parts kerosene in a vessel, heating in a separate vessel over hot air or steam until dissolved two parts of paraffine, thoroughly mixing the hot liquid paraffine with the hot mixture of camphor, citronella and kerosene, and then cooling the resultant product.

In testimony whereof I affix my signature.

JOHN W. MEYER. [L. S.]